(12) United States Patent
Shimizu et al.

(10) Patent No.: US 7,921,436 B2
(45) Date of Patent: Apr. 5, 2011

(54) OPTICAL DEVICE INTEGRATED HEAD

(75) Inventors: Junichiro Shimizu, Hino (JP); Masato Shishikura, Ome (JP)

(73) Assignee: Hitachi, Ltd., Tokyo (JP)

( * ) Notice: Subject to any disclaimer, the term of this patent is extended or adjusted under 35 U.S.C. 154(b) by 644 days.

(21) Appl. No.: 12/030,890

(22) Filed: Feb. 14, 2008

(65) Prior Publication Data

US 2008/0316872 A1 Dec. 25, 2008

(30) Foreign Application Priority Data

Jun. 21, 2007 (JP) ................................ 2007-163999

(51) Int. Cl.
*G11B 7/00* (2006.01)
*G11B 11/00* (2006.01)
(52) U.S. Cl. ...................... 720/659; 369/300; 369/13.24
(58) Field of Classification Search .................. 369/300, 369/112.29, 112.23, 112.24, 112.27, 112.04, 369/13.24, 13.02; 720/659, 672, 681, 682
See application file for complete search history.

(56) References Cited

U.S. PATENT DOCUMENTS

2008/0056073 A1* 3/2008 Shimizu ..................... 369/13.02

OTHER PUBLICATIONS

Hideki Saga, et al., New Recording Method Combining Themo-Magnetic Writing and Flux Detection, Jpn J. Appl. Phys., vol. 38 (1999) pp. 1839-1840.

* cited by examiner

*Primary Examiner* — Allen T Cao
(74) *Attorney, Agent, or Firm* — Antonelli, Terry, Stout & Kraus, LLP.

(57) ABSTRACT

An optical device integrated head having high light utilizing efficiency by decreasing the propagation loss caused from an optical source to a recording medium, conducting by mounting according to compact active alignment method for efficiently guiding a light generated from a laser device to the top end of a head, in which a light source device mounted on a submount has a mirror portion having an inclinated surface to at least a portion of one edge thereof for reflecting an output light from the optical source device at the inclinated surface, a structural member including a lens structure for further allowing a light to pass through the submount, and an optical waveguide disposed passing through a slider for mounting the submount, and the optical source and the slider are positioned by using active alignment of light in a chip-on carrier structure having the optical source device mounted on the submount.

13 Claims, 17 Drawing Sheets

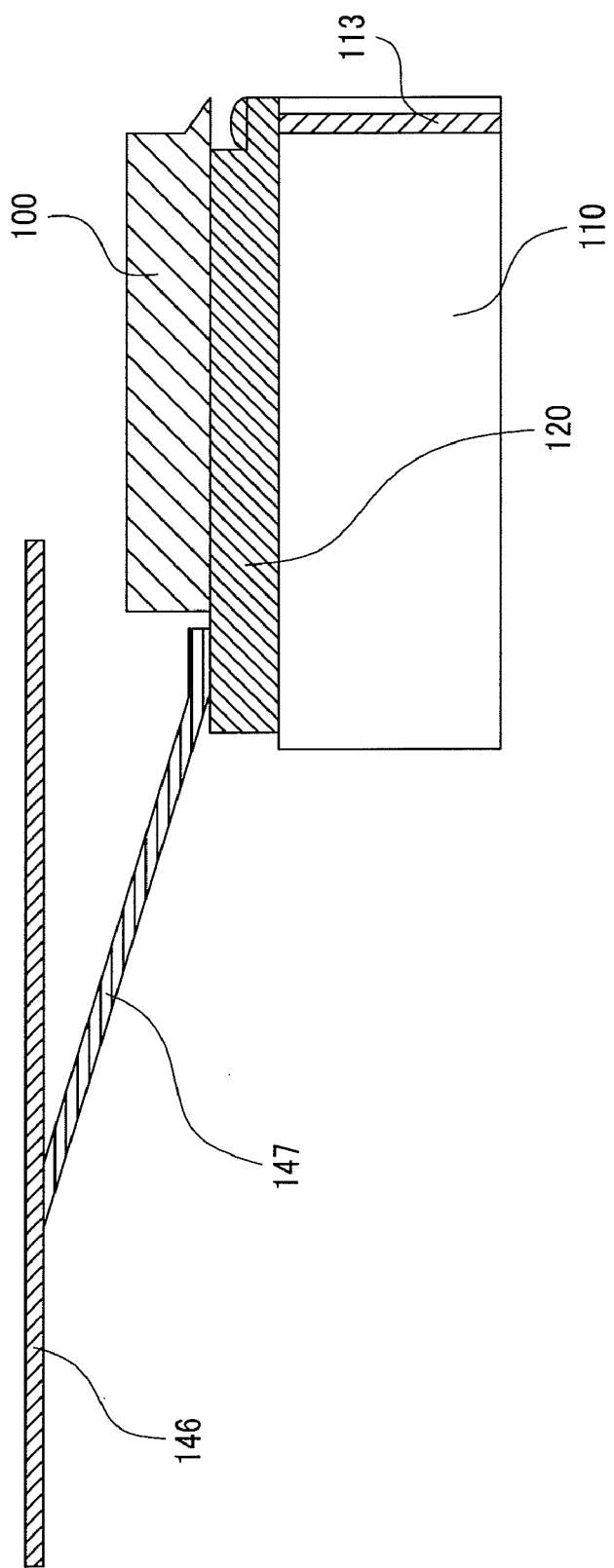

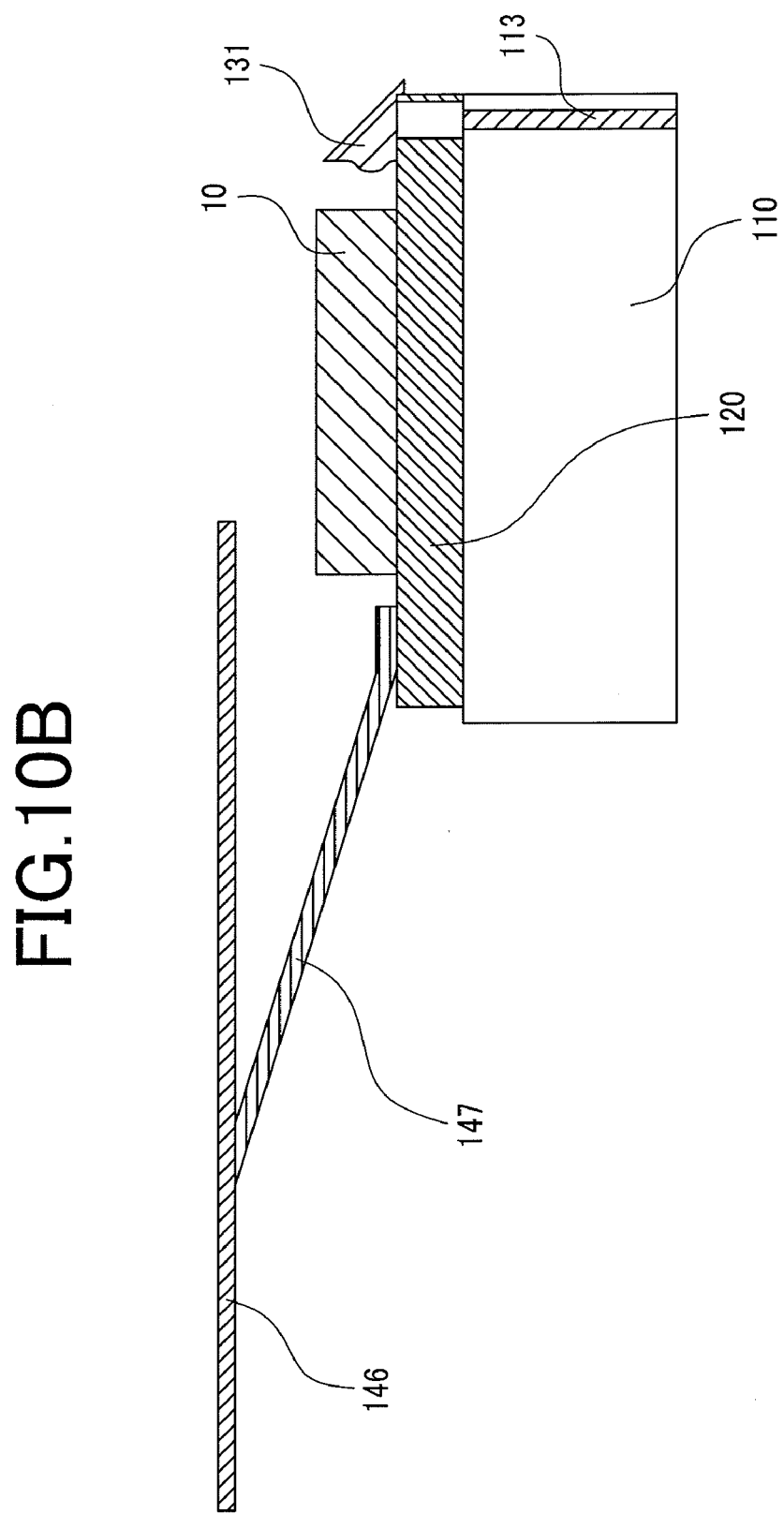

OPTICAL DEVICE INTEGRATED HEAD

CLAIM FOR PRIORITY

The present application claims priority from Japanese application JP 2007-163999, filed on Jun. 21, 2007, the content of which is hereby incorporated by reference into this application.

BACKGROUND OF THE INVENTION

1. Field of the Invention

The present invention concerns an optical device integrated head and it particularly relates to an optical device integrated head having a structure for guiding a laser light to a recording medium in an information recording apparatus at high recording density, an optical recording apparatus having an optical recording medium and means for writing to the recording medium by a laser light, and an optical-magnetic hybrid recording apparatus having a magnetic recording medium, writing means to the recording medium by magnetic fields and means for heating the recording medium by a laser light.

2. Description of the Related Arts

Along with development of the information society in recent years, digitalization and improvement in the quality of voice and images have been progressed, and the amount of data communication in internets has been increased remarkably. In association with them, the amount of electronic data stored in servers, etc. has been increased and larger capacity for the information recording system has been demanded. Higher recording density for storing enormous amount of information without enlarging the scale of apparatus has been demanded for optical disc and magnetic disc apparatus mounted in a computer or the like as one of information recording apparatus. Higher density means refinement of a recording bit size.

In the optical disc, a method of restricting an optical spot of a laser light to a bit size by a lens is adopted. For the refinement of the spot size, shortening of the wavelength of the laser light is effective. The minimum spot diameter of a light condensed by a lens is represented by a ratio of a wavelength and the numerical aperture of a lens used for light condensation and shorter wavelength is more advantageous for higher density. However, decrease in the spot by shortening the wavelength of the laser light has a limit for increasing the density, and a finer optical spot is necessary for the bit size required for the recording density at a $Tb/in^2$ order. For solving the problem, it has been studied for the refinement of the spot size not by condensation through the lens but by narrowing for the distance between the recording medium and the head and utilizing an optical near field. For attaining a high recording density in a magnetic disc apparatus, it is necessary to narrow the distance between the recording medium and the head and refine the crystal grain size of a magnetic film of the magnetic recording medium. Refinement of the crystal grain size in the magnetic recording medium involves a problem of making the particles thermally instable. For refining the crystal grain size and ensuring the thermal stability at the same time, it is effective to increase the coercivity. Increase in the coercivity requires increase in the intensity of a head magnetic field necessary for recording.

However, since there is a limit in the physical property of the magnetic pole material used for a recording head and narrowing of the distance between the magnetic disc and the head, it is difficult to increase the coercivity along with increase in the recording density.

For solving the problems described above, a hybrid recording technique of combining an optical recording technique and a magnetic recording technique has been proposed (refer to Hideki Saga, et al., "New Recording Method Combining Thermo-Magnetic Writing and Flux Detection", Jpn. J. Appl, Phys., Vol. 38(1999), p. 1839-1840). During recording, a medium is heated along with generation of an application magnetic field to decrease the coercivity of the medium. This facilitates recording also to a recording medium of high coercivity for which recording was difficult by an existent magnetic head due to insufficiency of a recording magnetic intensity. For regeneration, a magnetoresistive effect used in the existent magnetic recording is utilized. Such a hybrid recording method is referred to as thermally-assisted magnetic recording or optically-assisted magnetic recording. For the optically heating mechanism, a method of restricting a laser light by a lens used in existent optical recording can be used. However, increase in the recording density of the magnetic disc apparatus has a limit in the spot diameter that can be restricted by the existent method. As a method of solution, a method of utilizing an optical near field has been proposed like in optical discs.

In the optical recording or thermally-assisted magnetic recording by using the optical near field, a laser light generated from a laser light source is guided to a recording head and used being converted into an optical spot diameter of a size and a shape suitable to recording by a device having a function of generating an optical near field (hereinafter referred to as an optical near-field transducer). Usually, among the laser light sources, a semiconductor laser diode (hereinafter referred to as laser diode) which is small in the size and decreased in the power consumption is used as the laser light source, in view of the requirement for the use in a package of a disc drive.

Both in the optical recording and thermally-assisted magnetic recording, a sufficient light intensity suitable to recording is necessary. This is an optical intensity necessary for changing the property of the material constituting bits in the optical recording and an optical intensity necessary for heating in order to lower the coercivity sufficiently to facilitate magnetization reversal of the recording medium in the thermally-assisted magnetic recording.

The optical output generated from a semiconductor laser is usually about 30 to 100 mW in a 780 nm wavelength band and a 650 nm wavelength band which are most popularized wavelength bands for optical recording light sources. Optical loss is caused till the optical output reaches the surface of the recording medium and it lowers to about several mW. An optical output about at a comparable level is necessary on the recording medium surface also in application use in the optical recording apparatus and thermally-assisted magnetic recording apparatus using the optical near field for attaining a recording density at $Tb/in^2$ or more.

An optical near-field transducer is a device of generating a light of an extremely small spot size from a light of relatively large spot size by using a surface plasmon resonance phenomenon. In the recording density at a $Tb/in^2$ order, the size for 1 bit is several tens nm and the size of the optical near-field transducer is about several hundreds nm.

An optical part is used for guiding a light generated from a laser diode to an optical near-field transducer. An optical loss is caused till the light generated from the laser diode is guided to the optical near-field transducer and, further, the spot size of a light restricted by a waveguide or a lens is larger compared with the size of a near-field transducer and, among the light incident to the optical near-field transducer, about from several % to ten and several % of the incident light is converted into the optical near field. Accordingly, a sufficient optical out is necessary for the laser diode when considering the optical loss caused in the course till the light reaches the recording medium. However, the intensity of light that can be generated by the semiconductor laser diode cannot be increased infinitely and it should be driven within the optical output generated at determined driving current or power consumption as the rating of the laser diode.

Optical parts for guiding the laser light generated from the laser diode to the optical near-field transducer include, for example, a reflection mirror, a lens, and an optical waveguide. The light generated from the laser diode is propagated through optical parts arranged in an optical channel and reaches an optical near-field transducer or a recording medium located anteriorly. In the course of passage through the optical channel the intensity of light decays to one/several to one/several tens of the optical output generated from the laser diode. The main cause for the decay of the light intensity includes, for example, absorption loss or scattering loss upon propagation through optical parts, coupling loss attributable to misalignment caused upon connection of optical parts (positional displacement of optical axes or difference of spot size). Such optical losses are collectively referred to as propagation loss.

For obtaining a sufficient optical intensity required for recording, it is necessary to increase the intensity of light generated from the laser diode, or decrease the propagation loss. For increasing the optical output of the laser diode, driving of the laser diode by a high current is necessary which requires increase in the output of the laser diode. However, since the intensity of light generated from the laser diode is limited, it is not practical to merely increase the optical intensity of the laser diode. This is because increase in the output of the laser diode is generally accompanied by the increase in the size of the device. Increase in the size results in remarkable increase of the power consumption and heat generation of the laser diode. Accordingly, it is an important technology to guide the light generated from a semiconductor laser efficiently to the top end of the head, that is, to decrease the propagation loss.

SUMMARY OF THE INVENTION

For efficiently guiding a light generated from a laser diode to a top end of a head, it is demanded to decrease the optical loss caused in the inside of optical parts, and the coupling loss caused at contacts of the optical parts. The optical loss caused in the inside of the optical parts is attributable to the absorption or scattering of the light depending on the properties of materials constituting the parts. The coupling loss caused at the contacts of the optical parts is mainly attributable to the misalignment of optical field shapes between optical parts to each other, the distance in the direction of the optical axis or positional displacement in the direction perpendicular to the optical axis of the parts to each other caused upon bonding or joining optical parts. It is necessary for decreasing the former optical loss to use less scattering and less absorptive materials and decrease the optical distance by decreasing the size of parts. For decreasing the latter coupling loss, it is necessary to match the size and the shape of optical fields of the parts and prevent displacement of the optical axis of parts in the axial direction or the lateral direction. When the optical loss is decreased, the optical output necessary for the laser diode can be decreased to obtain an optical output necessary for recording. Further, decrease in the size and lowering in the power consumption of the laser diode can be attained and, as a result, restriction due to the size of the laser diode is moderated, to increase the degree of freedom for the design of arrangement of the laser diode.

The spot size of the laser light emitted from the laser diode is generally about from 1 to 2 μm at the emission surface and since it enlarges as receding from the emission surface, this is too large as it is for the recording bit. For converting the spot size and the shape, an optical near-field transducer is necessary. So long as optical parts are used from the laser diode to the optical near-field transducer, it is difficult to eliminate the propagation loss completely and there is a practical limit on the decrease of the optical loss merely by the selection of material or the alignment technique. Further, since an optical recording head or a magnetic recoding head itself is small relative to the optical parts, a restriction exists when the optical parts are arranged in view of mounting due to the size of the parts per se and the tolerance necessary for the optical system, and it is difficult to attain the constitution of decreasing the propagation loss.

Accordingly, decrease in the number of the optical parts is a best method for attaining decrease in the propagation loss caused from the light source to the recording medium and, at the same time, overcoming the restriction in the mounting. Therefore, it is desirable to locate the laser diode as the light source near the head and couple the laser diode to the head portion without using optical parts between the laser diode and the head. That is, integration of the laser diode on the head is one of methods for minimizing the propagation loss.

Particularly, in the magnetic disc represented by a hard disc, however, the top end as a main part of a recording head is a rectangular solid having a size of about several hundreds μm for one side, and the size is at an order identical with the size of the laser diode. Accordingly, for the arrangement upon mounting the laser diode as the light source to the head, there exists a restriction in view of mounting due to the size of the laser diode.

In a case of an optical head using an optical near field or a magnetic head, since the size of the laser diode is at an order identical with that of the head, careless mounting of the laser diode on the head flying above the disc that rotates at a high speed may possibly gives an undesired effect on the operation of the head. This is identical also in a case of mounting an optical part other than the laser diode to the head. The size of a part at the top end of the head referred to as a slider as a main part used at present for magnetic recording is about 1000 μm or less for the length and the width and about 300 μm for the thickness. Further, it will be expected that miniaturization will proceed for the head, and the slider is decreased further in the length, width and thickness.

As described above, in a system where there is no difference in the order of the size between the slider and the laser diode mounted thereon and the laser diode is directly mounted on the slider, the way of mounting the laser diode gives an effect on the shape of the entire head.

The shape of an edge-emitting laser diode, which is a most popularized laser diode, is rectangular solid and the emitting direction of the light is in the longitudinal direction which is a direction of a cavity of the laser diode. Accordingly, for guiding the light from the laser diode to the optical near-field transducer located in a lower portion of the slider, the laser diode is usually mounted with the longitudinal direction thereof being in a direction perpendicular to the plane where a recording medium is present.

A usual edge-emitting laser diode device for general recording semiconductor has a size of about 500 to 1,500 μm length, about 200 to 400 μm width, and about 100 μm thickness. The length of the laser diode means the cavity length which has a close relation with a maximum optical output that the laser diode can generate.

The cavity length of the laser diode is several times compared with the thickness of the slider. The slider flies while keeping a minimum gap relative to a rotating recording medium. This structure keeps a positional relation between the slider and the medium in parallel. The slider is prepared in a precise shape to stably fly aerodynamically even at a rotational speed of a disk exceeding 10,000 rpm. When the laser diode is mounted on the slider in a direction that the cavity is in perpendicular to the recording medium, the entire shape of the head that mounts the laser diode thereon has a structure longest in the longitudinal direction. This mounting method not only leads to instabilization upon flying of the head to the medium but also restricts the movable space of the head.

In a case of using a laser diode of a short cavity with a cavity length of about 100 μm, the problem described above may possibly be solved. However, there exists a trade-off relation that as the cavity length is intended to be shortened, the maximum value of the optical output that can be generated is decreased. Accordingly, when the cavity of the edge-emitting laser diode is shortened, no sufficient optical output as in the recording laser diode used generally cannot be obtained. Further, in a surface emitting laser diode such as VCSEL (Vertical Cavity Surface Emitting Laser), while the cavity length can be shortened remarkably relative to the edge-emitting laser diode, since the optical output obtainable at the time of emission from the laser diode is about several mW at the highest, like the edge-emitting laser diode of short cavity, this is extremely insufficient as optical output necessary for recording. Accordingly, approach in view of the shortening of the cavity may be considered not suitable to the intended purpose.

As described above, the slider has a rectangular solid shape which is longer in the direction parallel with the medium compared with the direction perpendicular to the medium. Accordingly, it is mounted relatively easy on the slider with the cavity being in parallel with the medium compared to the case of mounting with the slider being in perpendicular thereto and this gives less effect on the flying characteristic or the movability of the head. However, since the laser diode emits a light in the direction of the cavity, it requires an optical structure for rotating the propagating direction of the light emitted in the horizontal direction by about 90 degree and guiding the same to an optical near-field transducer at the top end of the slider. For rotating the direction of the light by about 90 degree in a short distance, a glass type optical mirror such as a prism is generally used.

It is necessary to dispose the optical near-field transducer on the air bearing surface of a slider and enter a light rotated by the reflection mirror in the propagating direction. The method of guiding a light from a portion above the slider to the optical near-field transducer in the lower portion of the slider includes a method of condensing a light to the optical near-field transducer by using a lens and a method of using an optical waveguide. Among them, a method of using the optical waveguide may concentrate a laser light at a high efficiency to the optical near-field transducer. The optical waveguide usually has a structure including a core of a high refractive index present at the center and a cladding of a lower refractive index for confining a light in the core. By using a material of high refractive index to the core, it is possible to make the spot of the light into a submicron-size and combine the same efficiently to the optical near-field transducer to thereby generate near field light.

In this case, for guiding a light from the laser diode to the optical waveguide formed in the slider, efficient optical coupling between the laser diode and the optical waveguide is important. Generally, for optically coupling two waveguides at a high efficiency, it is more preferred that the shape and the size are more similar between the optical fields on the coupling side and the side to be coupled with each other.

It is considered such a case of coupling a light from the laser diode to a waveguide formed in the slider by using a reflection mirror. Upon passage through a reflection mirror, the light emitted from the laser diode goes by way of an optical channel in accordance with the size of the mirror. Since the size of the reflection mirror, even when it is small, is several tens μm for the longitudinal or the lateral direction which is the waveguide direction of light in view of manufacture, the optical channel length reaches several tens μm at the shortest. By the way, when a light emitted from the laser diode is propagated in the material of the reflection mirror or in air, the field of the light enlarges abruptly and this trend becomes remarkable as the optical channel is longer and the refractive index thereof is smaller.

The method of preventing the lowering of the coupling efficiency includes a method of using a collimator lens. A collimator lens is located before or after the passage of the reflection mirror, which converts a light emitted from the laser diode into a parallel light and then allows the light to pass through the optical channel of the reflection mirror. This prevents enlargement of the optical field even when the optical distance is formed by passage through the reflection mirror and the light is condensed again by using a lens after passage of the reflection mirror and coupled to the optical waveguide in the slider of a small spot diameter.

In this case, for coupling the light with the optical waveguide in the slider, it is necessary that the optical axes are aligned at a high accuracy. Particularly, when a number of optical parts are used, a method of at first combining several parts into composite components and then accurately aligning the optical axes of the finally formed two composite parts. For accurately aligning the optical axes, a method of alignment by passing a light through the optical parts is used.

For example, in a case of attaining optical alignment with the optical waveguide in the slider by using a laser diode, mirror, and lens, the laser diode, the mirror, and the lens are assembled at first into a composite component. By introducing a light from the composite part or the optical waveguide in the slider, they can be assembled with the optical axes thereof being aligned accurately to complete one head. A method of aligning the optical axes by using a light as described above is referred to as an active alignment method.

However, use of the lens results in a disadvantage of increasing the optical distance and increasing the mounting space and the number of parts. Further, the size of an actual lens is usually about from several hundreds μm to several thousands μm, which is too large to be mounted on a magnetic head including the slider. This is more fatal in a case where the decrease in the size for the head proceeds.

Accordingly, the present invention intends to attain an optical device integrated head of high light utilization efficiency decreased in propagation loss which is caused from a light source to a recording medium by decreasing the number of parts and mounting them by a compact active alignment method.

For decreasing the number of parts, it is effective to at first monolithically integrate parts having respective functions to each other. Then, for conducting the active alignment, it is effective to use a submount for mounting and driving a laser diode.

The invention intends to provide a structure for monolithically integrating optical parts and conducting active alignment. The method is to be described below.

At first, description is to be made to a mounting method of using a structure of monolithically integrating a laser diode and a reflection mirror. FIG. 1 and FIG. 2 are perspective views showing a structure of at first mounting the laser diode to a submount and then mounting the submount having the laser diode mounted thereon to the slider.

At first, as shown in FIG. 1, a micro mirror 105 comprising a material of high refractive index and having an angle of about 45 degree relative to the extending direction of a cavity is monolithically integrated together with the cavity to the emission edge of an edge-emitting laser diode, to form a structure of emitting a light from the surface of the laser diode by rotating a light emitting usually in the direction of the cavity by about 90 degree. The mirror-integrated laser diode 100 can decrease the number of parts and overcome the problem of the mounting space. Then, the mirror-integrated laser diode 100 is mounted on a submount 120 with the direction of the cavity being in parallel with the slider. In this case, since it is not necessary to mount the laser diode 100 and the submount 120 at a high accuracy, a method of mounting by using positioning markers as a reference may suffice.

Then, as shown in FIG. 2, the mirror-integrated laser diode 100 is mounted such that a light emitting from the surface of the diode mounted to the submount 120 is guided transmitting through the submount 120 to the light incident surface of an optical guide 113 disposed in a direction passing through the slider 110 and coupled with the optical waveguide 113. Since it is necessary to conduct alignment only at one position for ensuring the optical coupling, mounting at a high accuracy can be attained. Further, when the structure is adopted, since alignment is conducted by using a COC (Chip On Carrier) structure in which the laser diode 100 is mounted to the submount 120, an active alignment method of mounting the laser diode 100 in a light emission state can be adopted, so that mounting at a high accuracy is possible. Further, since the laser diode 100 is in parallel with the slider 110 and the thickness of the submount 120 can be made equal with or less than the thickness of the laser diode 100, less effect is given on the flying property or the movability of the head.

FIG. 3 is a perspective view of a completed optical device integrated head and FIG. 4A is a view showing a cross section of the laser diode 100 in FIG. 3 along the direction of the cavity. It is necessary that the submount 120 has a strength capable of enduring the mounting of the laser diode and the alignment operation, it requires a thickness of at least several tens μm, which separates the light emission surface 107 of the laser diode 100 and the incident surface 117 of the optical waveguide of the slider. Since the light emitted from the micro emission portion of the laser diode generally increases the size of the optical field when it is propagated through a space, it requires a structure of preventing or compensating enlargement of the field in order to obtain good coupling with the optical waveguide 113. Accordingly, the effect by the active alignment method for the mounting can be obtained only by the provision of a structure capable of compensating an optical distance, if any, corresponding to the thickness of the submount, and providing a high optical coupling efficiency.

Accordingly, the following structure is provided to the submount 120. At first, a structure 123 capable of transmitting a light from the first surface 121 for mounting the laser diode device 100 to the second surface 122 opposed thereto is provided to the submount 120 for guiding a light emitted from the surface of the laser diode 100 to the incident surface 117 of the optical waveguide of the slider. For a usual submount used for recording or communication laser diode, a copper-based alloy, silicon, silicon carbide, or aluminum nitride is used with a view point that the difference in the thermal expansion to the laser diode is small, to exert no stress after mounting, and thermal conductivity is good, etc. Usually, the laser diode mounted to the submount emits a light in the direction parallel with the submount from the edge in the edge-emitting laser diode and in the direction perpendicular to the submount from the surface on the side opposite to the submount in the surface emission laser diode.

Accordingly, the submount does not usually require a function of transmitting the light. Therefore, it is necessary to add a function of transmitting the light in the inside of the submount. For this purpose, it is necessary to form a through hole larger than the spot size of the light in the direction of the thickness of the submount 120, or use a submount prepared from a material transparent to a light emitted from the laser diode 100. In the latter case, it is not always necessary that the entire submount is formed of a transparent material but it may suffice that a portion through which the light emitted from the laser diode 100 transmits.

While the light emitted from the laser diode 100 can be transmitted by the method described above, passage through the optical distance corresponding to the thickness of the submount 120 lowers the coupling efficiency due to enlargement of the optical spot size. This can be solved by adding a lens structure 129 having a function of preventing the enlargement of the optical spot size or a function of restricting the enlarged spot to a small spot suitable to optical coupling between the slider and the waveguide. The lens structure means a structure of changing the direction of the light by utilizing a nonpolar configuration. The integrated micro lens structure can be manufactured by resin molding or cutting fabrication.

FIG. 4A shows an example of a lens structure 127 which a resin is embedded in a through hole as an example of the structure 127 for transmitting the light. Further, FIG. 5 is an example of a structure formed by fabricating the submount 120 and forming a micro-lens structure 129 therein. FIG. 6A is a view showing a cross section of the laser diode 100 in FIG. 5 along the direction of the cavity. The micro-lens structure 129 and the light transmitting structure 127 are formed of a material transparent to the light of the laser diode.

Further, a second method having a constitution different from the first method described above includes a method of using a structure of monolithically integrating a micro-lens structure 132 to a reflection mirror 131 as an independent part as shown in FIG. 7. FIG. 8A is a view showing a cross section along the direction of the cavity of the laser diode 10 in FIG. 7. A reflection mirror 131 and an edge-emitting laser diode 10 integrated a lens structure 132 is mounted on the submount 120. By emitting the laser diode 10 on a submount, a light is guided by way of the reflection mirror 131 to the second surface 122 of the submount, mounting by the active alignment method with the COC structure like in the structure shown in FIG. 3 and FIG. 5 is possible. By using the lens integrated mirror structure as described above, since the parts to be mounted are two parts, i.e., the edge-emitting laser diode 10 and the lens integrated reflection mirror 131, the mounting space can be ensured.

Then, the procedures of mounting by the active alignment method are to be described with reference to FIGS. 9A to 9D. In FIG. 9A, a surface emission laser diode 100 having a micro-mirror integrated thereto is mounted on the submount 120. The submount 120 is provided with a structure of transmitting a light and a lens structure, and the first surface 121 of the submount 120 for mounting the laser diode is provided with a lead 126 for supplying electric power. The laser diode 100 is mounted such that the light emission surface 107 substantially agrees with the position of the structure 127 for transmitting the light of the submount 120. In this case, the laser diode and the submount are positioned, for example, by an infrared transmission system of using mounting index markers formed to both of the laser diode and the submount. The submount is provided with a pair of power supply leads for driving the laser diode and they are mounted such that one of the leads is connected with the p-electrode of the laser diode and the other of them is connected with the n-electrode of the laser diode. After mounting, the lead 126 is connected by way of a solder 125 to the electrode 106 of the laser diode.

Then, in FIG. 9B, a submount 120 having the laser diode 100 mounted thereon is mounted to the slider 110. In this case, the second surface 122 of the submount 120 is in contact with the slider 110. In FIG. 9C, when a power is supplied from an external power source to the power supply lead 126, the laser diode 100 emits a light. In a state of emitting the laser diode, the submount 120 and the slider 110 are moved relatively. In FIG. 9D, the light 108 propagates through the optical waveguide 113 and emitted from the lower portion of the slider when it is aligned with the optical axis of the optical waveguide 113 disposed to the slider. A light 118 outgoing from the ABS surface 111 is detected by a photo diode 130 and the slider 110 is fixed at a position where the most intense light is detected. In this way, the slider 110 is fixed by using glue 112 at a position where the emitting laser diode 100 and the waveguide 113 disposed to the slider are aligned.

By using the structure and the mounting procedures of the invention, the laser diode can be mounted at a high accuracy to the slider by the active alignment method to attain an optical device integrated head at a high light utilization efficiency.

DESCRIPTION OF THE ACCOMPANYING DRAWINGS

Figure 9A:
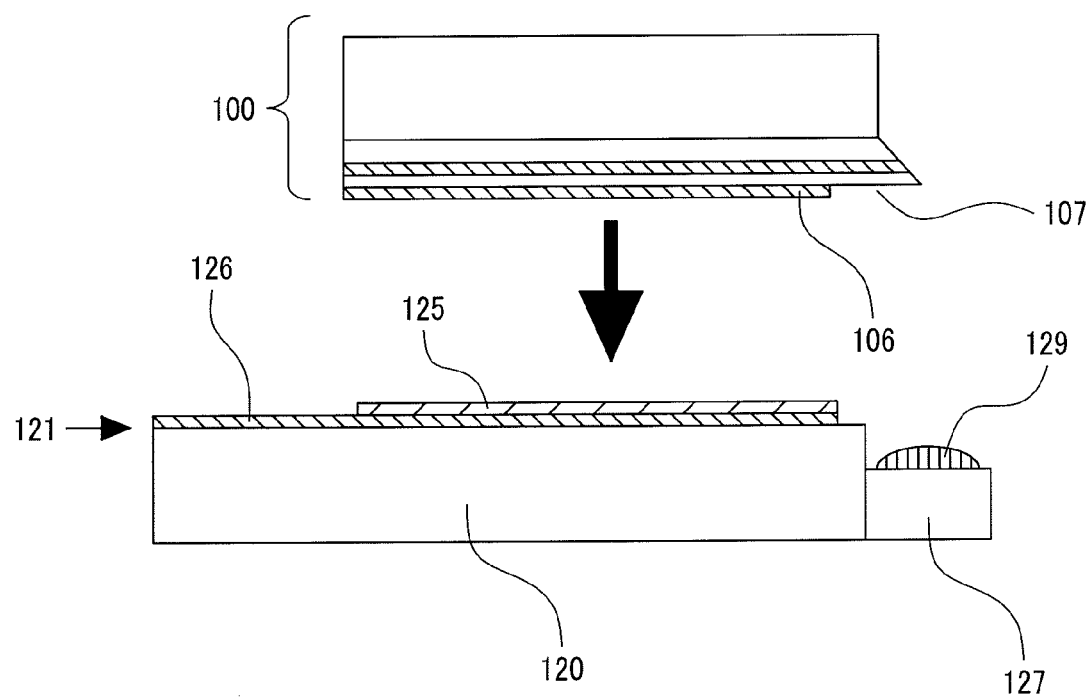
Figure 9B:
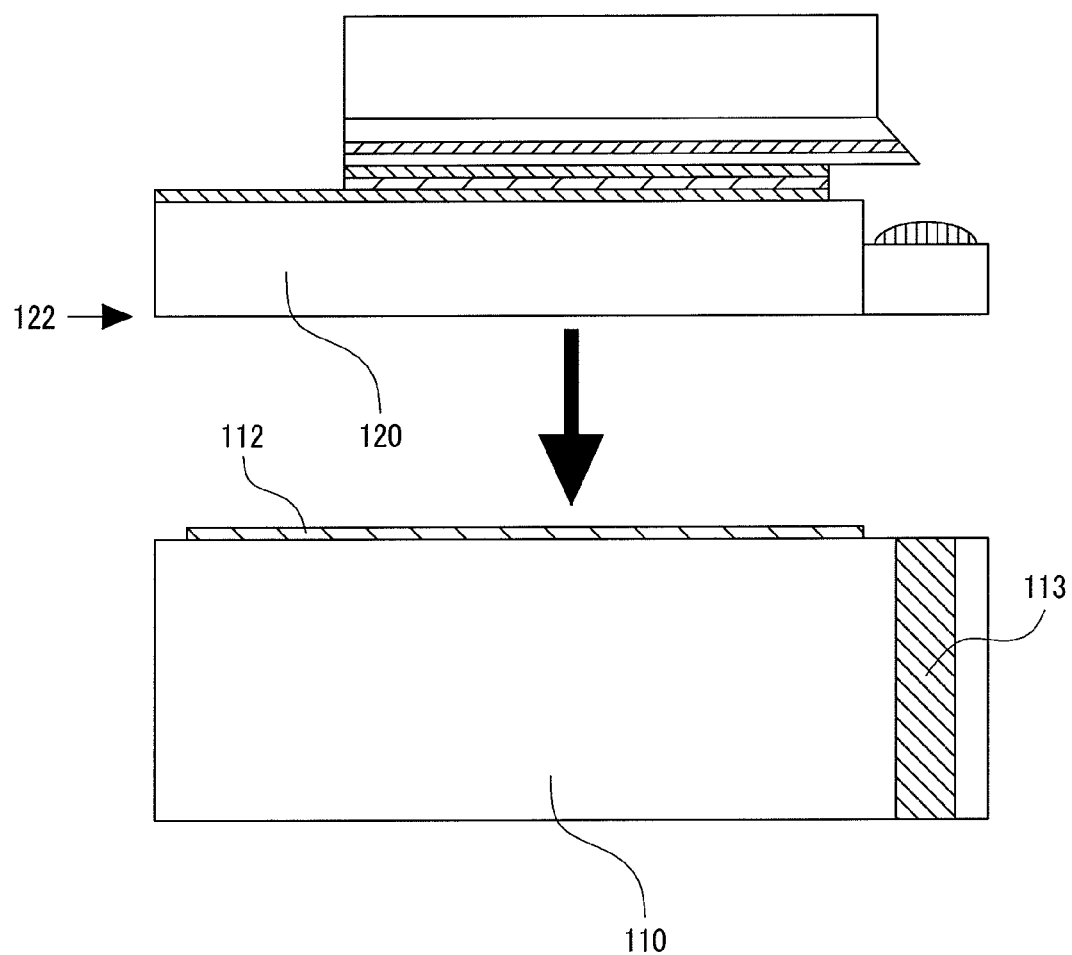
Figure 9C:
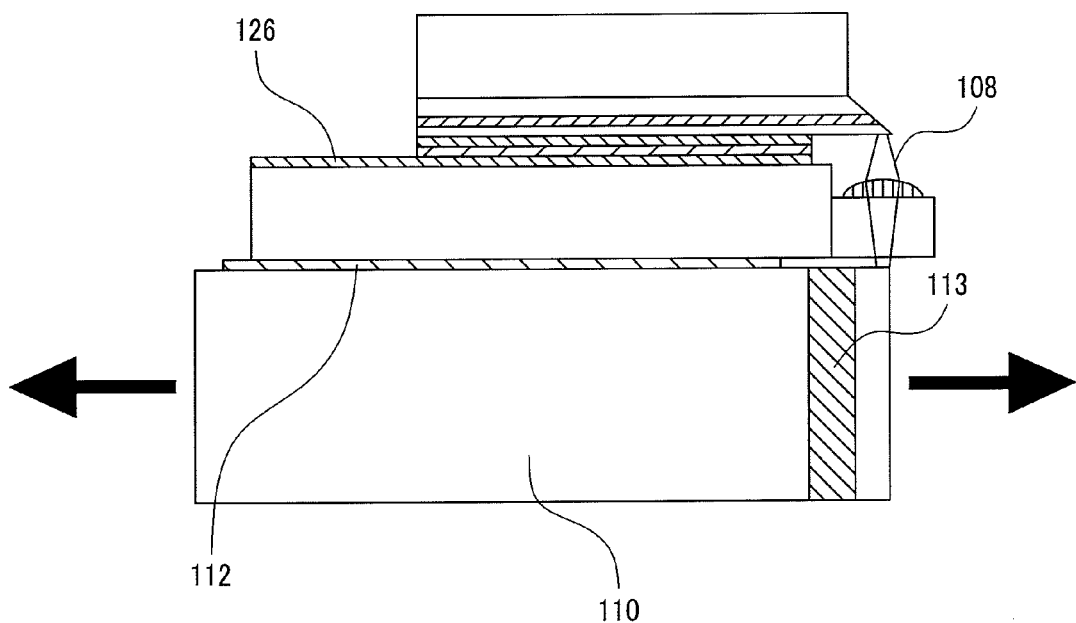
Figure 9D:
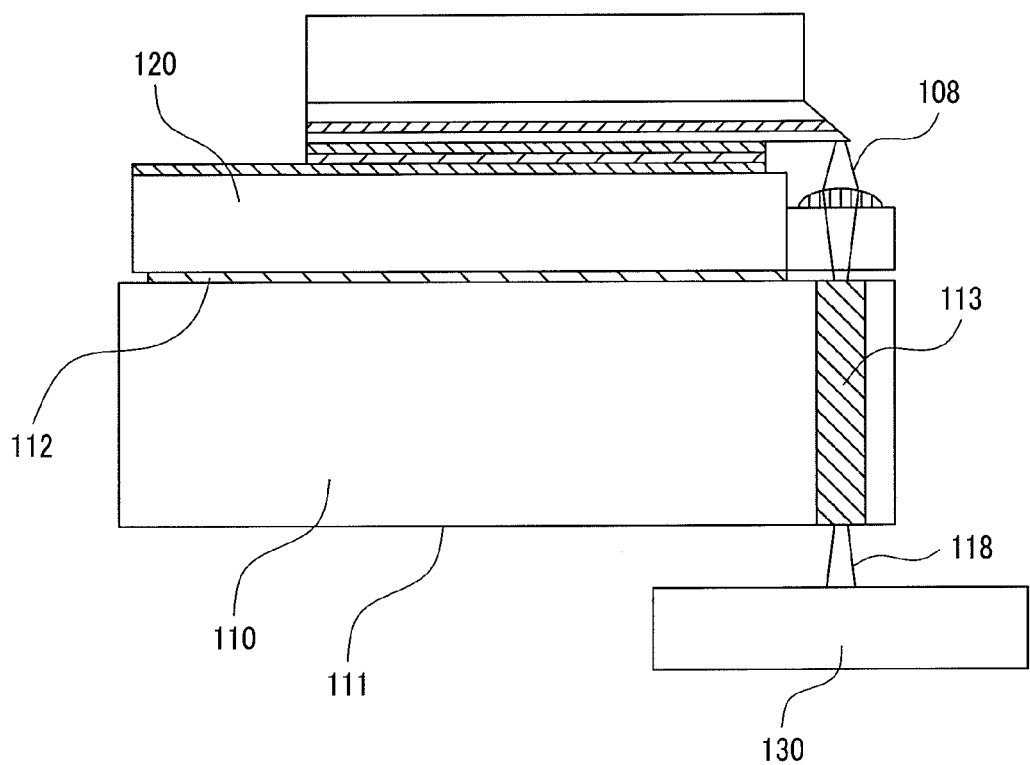
Figure 11A:
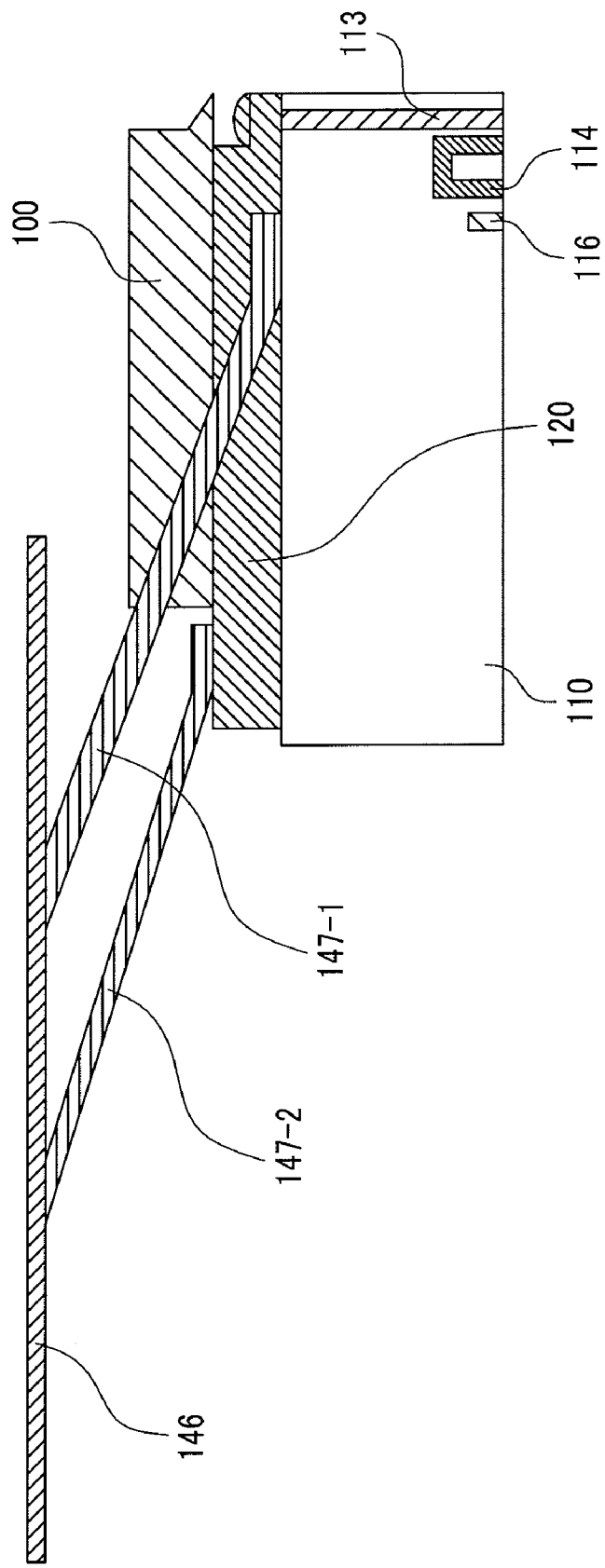
Figure 11B:
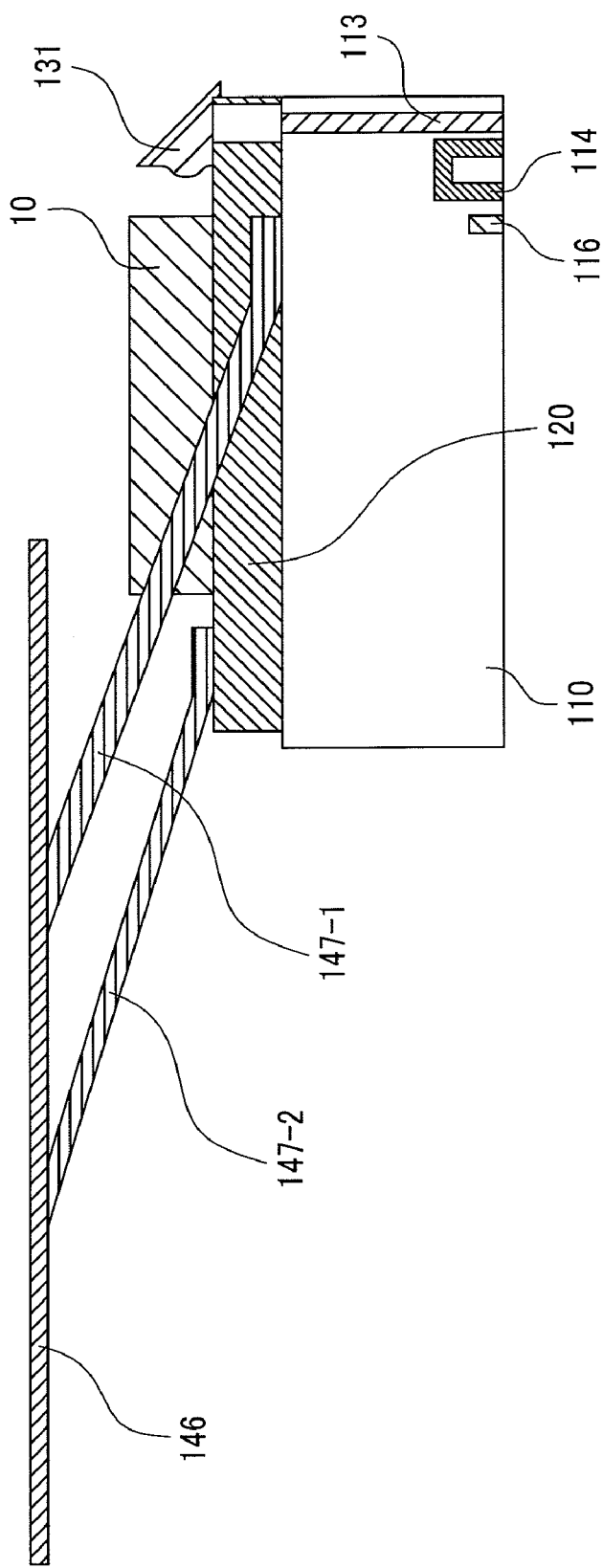
Figure 12:
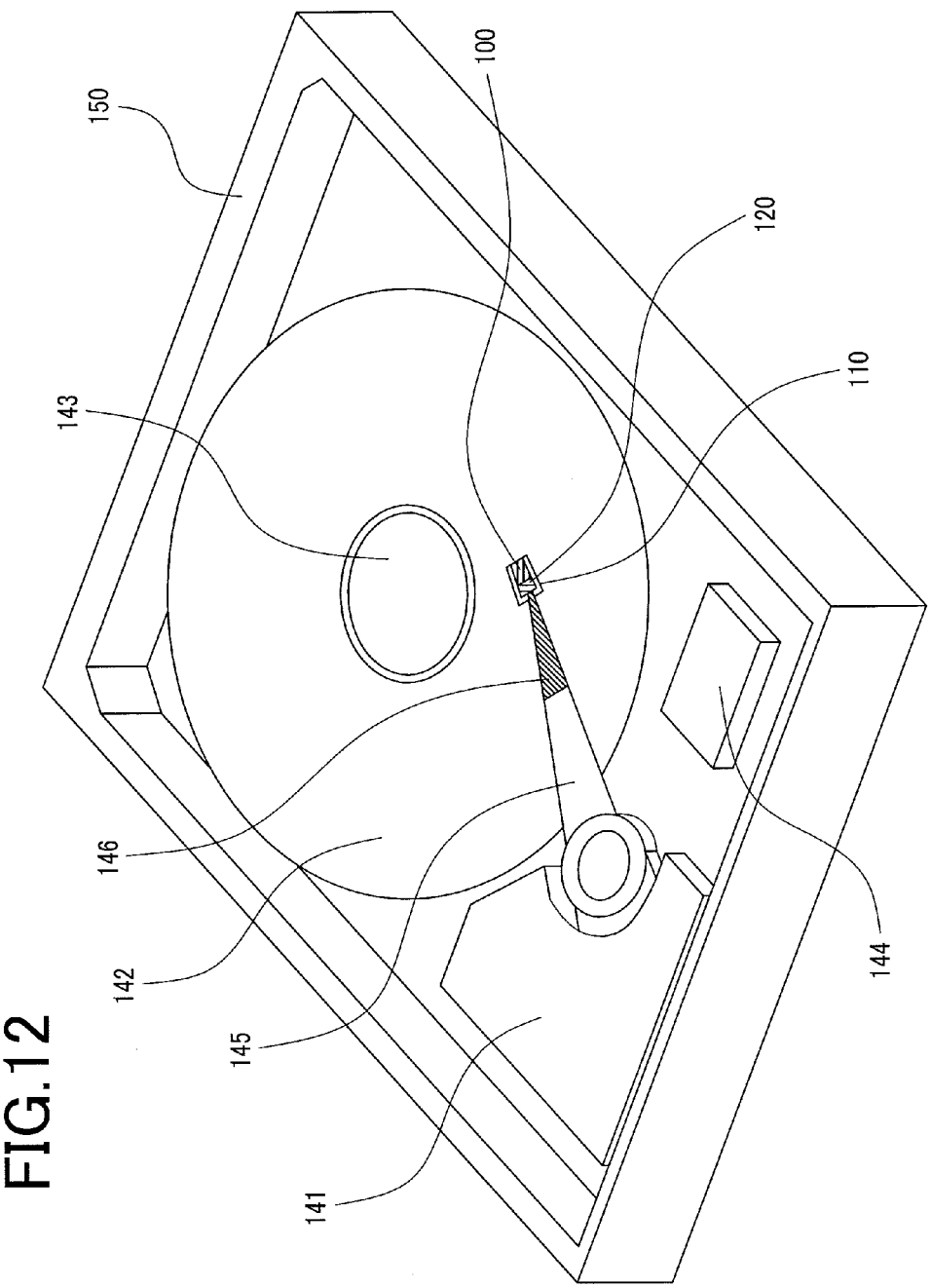

FIG. 9A is a schematic view showing the procedure of mounting a laser diode, a submount, and a slider, FIG. 9B is a schematic view showing the procedure of mounting a laser diode, a submount, and a slider, FIG. 9C is a schematic view showing the procedure of mounting a laser diode, a submount, and a slider, FIG. 9D is a schematic view showing the procedure of mounting a laser diode, a submount, and a slider, FIG. 10A is a schematic view of a structure in which an optical device integrated head and a head-driving suspension are connected;

FIG. 10B is a schematic view of a structure in which an optical device integrated head and a head-driving suspension are connected;

FIG. 11A is a schematic view of a structure in which an optical device integrated magnetic head and a head driving suspension are connected;

FIG. 11B is a schematic view of a structure in which an optical device integrated magnetic head and a head-driving suspension are connected; and FIG. 12 is a schematic view showing a recording disk apparatus using the optical device integrated head according to the invention.

PREFERRED EMBODIMENTS OF THE INVENTION

The present invention is to be described for preferred embodiments with reference to the drawings.

Embodiment 1

Figure 1:
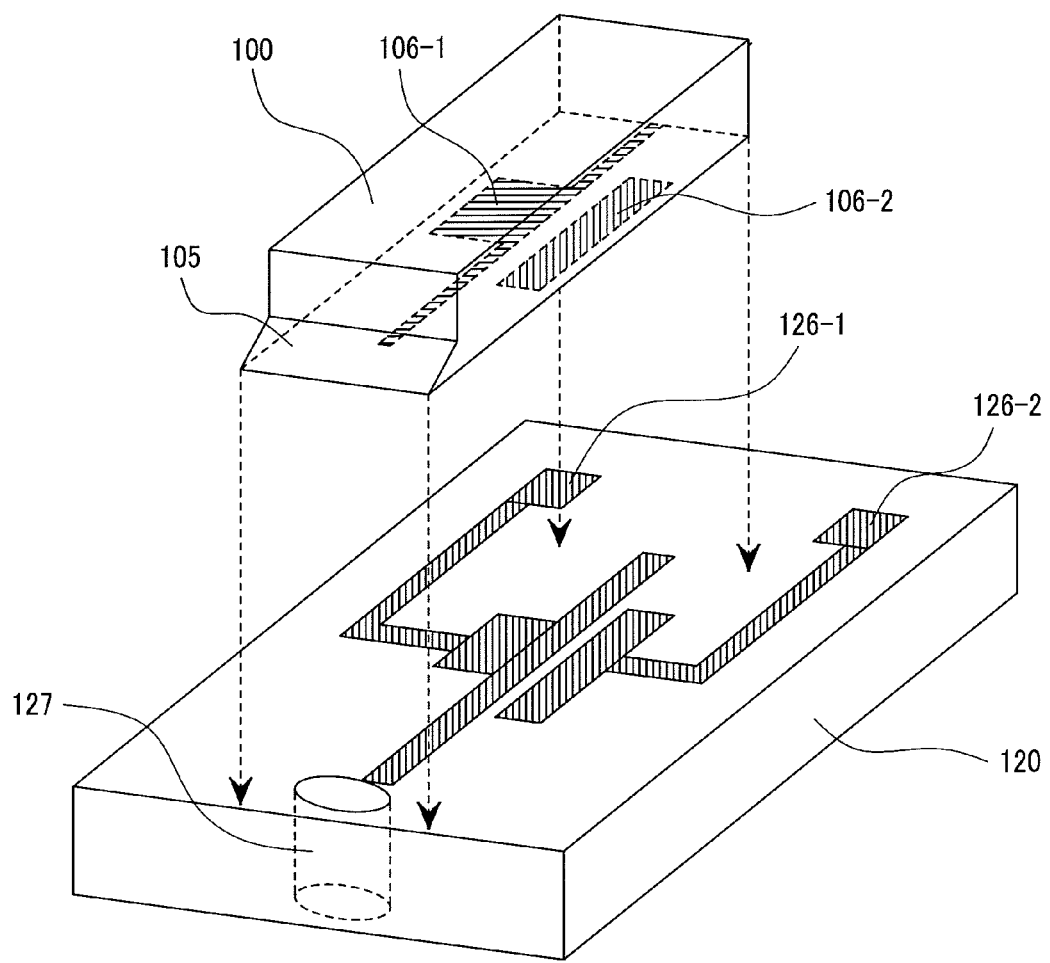
FIG. 1 is a perspective view showing a state of mounting a semiconductor laser diode in which a reflection mirror is integrated monolithically to a submount having a structure of allowing a light to pass in the direction of a thickness and a lens structure.
Figure 2:
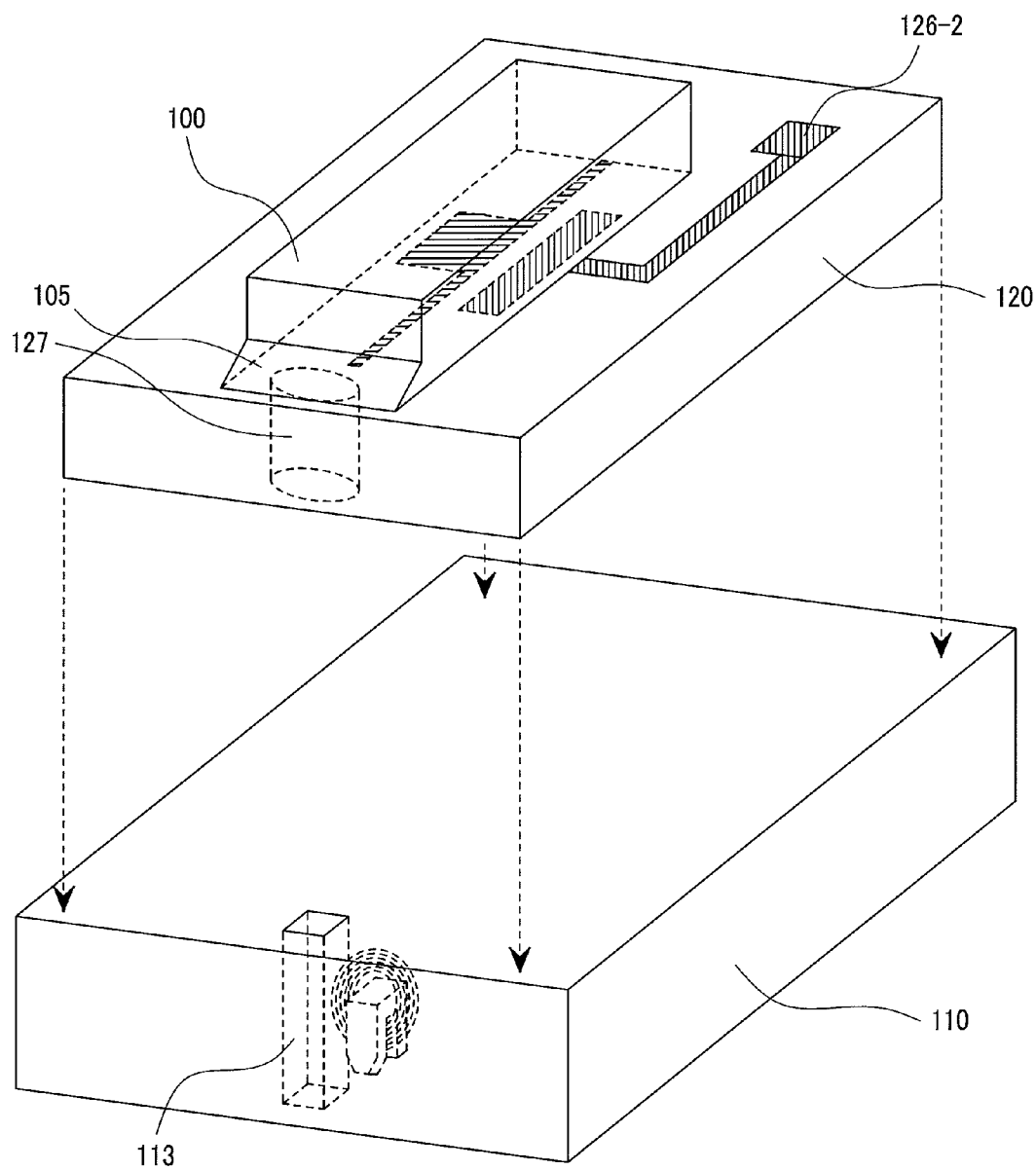
FIG. 2 is a perspective view showing the state of mounting a submount that mounts the semiconductor laser diode to a slider having an optical waveguide.
Figure 3:
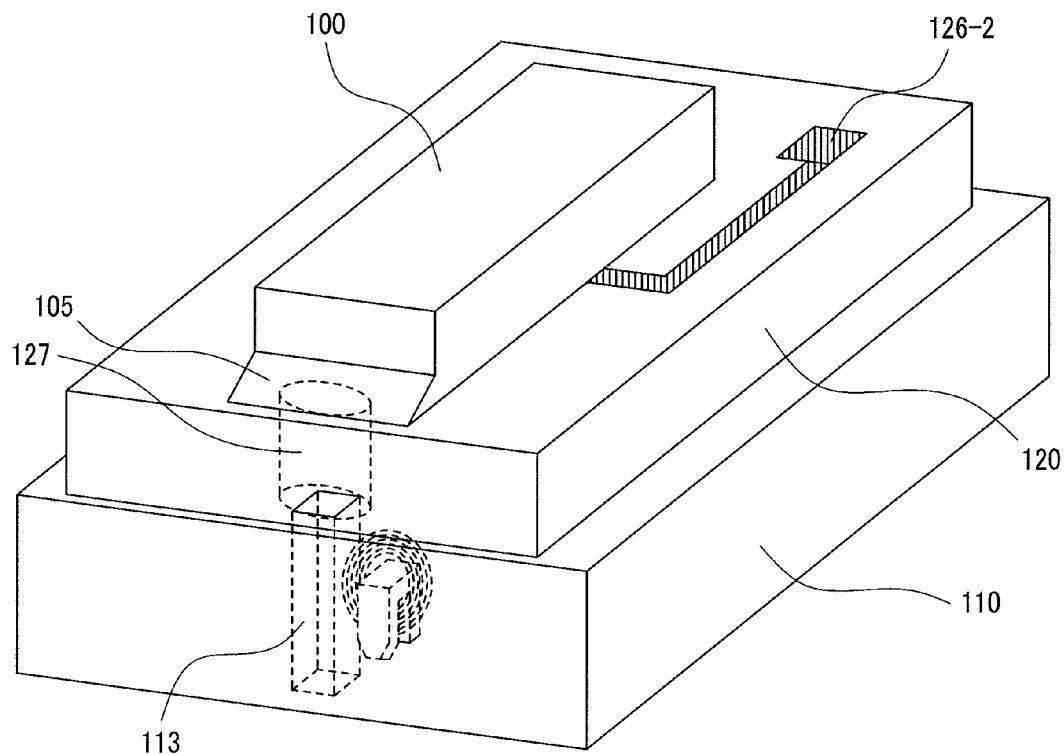
FIG. 3 is a perspective view showing an optical device integrated head which is a structural body in which a submount having a semiconductor laser diode mounted thereon is mounted to a slider.
Figure 4A:
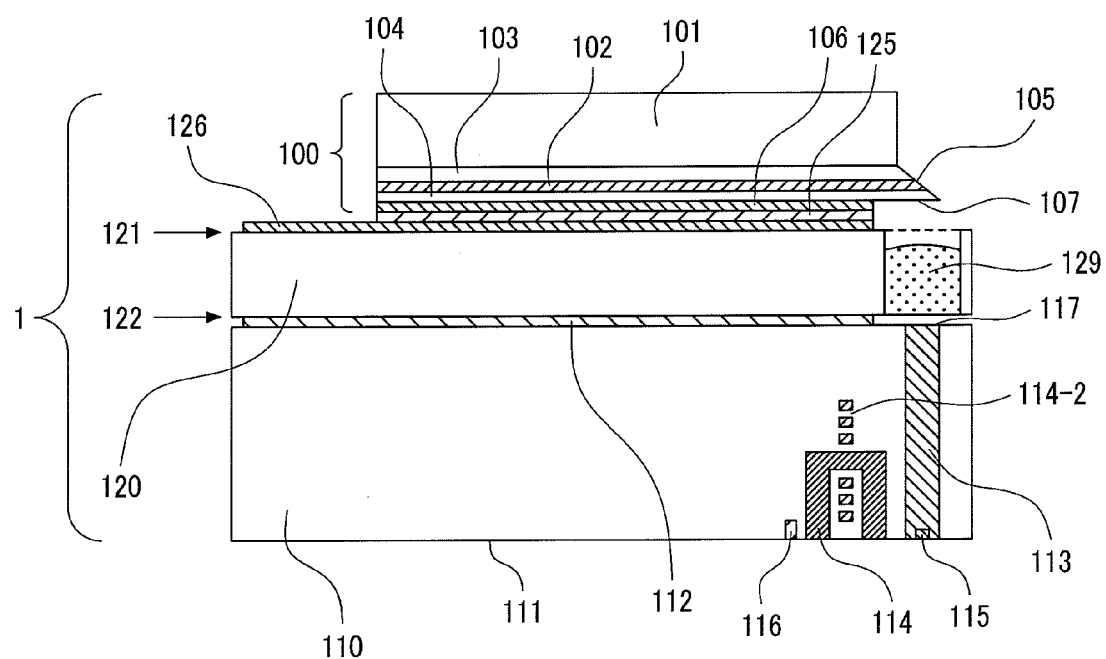
FIG. 4A is a cross sectional view of an optical device integrated head as a structural body in which a submount having a semiconductor laser diode mounted thereon is mounted to a slider, along the direction of a cavity of the laser diode.
Figure 4B:
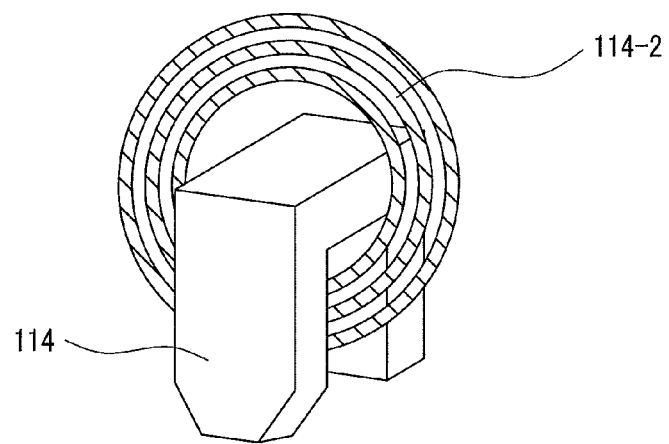
FIG. 4B is a perspective view showing a magnetic transducer mounted to the optical device integrated head in FIG. 4A.

FIG. 3 shows a preferred embodiment of the invention. This is a perspective view schematically showing an optical device integrated head manufactured by mounting a semiconductor laser diode having a reflection mirror monolithically integrated thereon to a submount and mounting the submount on a slider. FIG. 4A is a view showing a cross section of a laser diode along the direction of a cavity. FIG. 4B shows a perspective view of a magnetic transducer and coils to be mounted in FIG. 4A.

A laser diode has a monolithically integrated reflection mirror 105, and emits a light from a light emission surface 107. A laser diode 100 is mounted to the first surface 121 of a submount 120 in such a positional relation that a light transmits a structure 127 for allowing the light of the submount to pass therethrough. Electric leads 126 (126-1, 126-2) for driving the laser diode are disposed on the first surface 121 of the submount 120 and mounted being welded to electrodes 106 of the laser diode by way of a solder 125. In a slider 110, an optical waveguide 113 that guides a light passing in the direction of the thickness is disposed, the slider 110 is mounted to the second surface 122 of the submount 120, and optical axes are aligned to each other such that the light emitted from the light emission surface 107 of the laser diode is passed through the submount, guided to the light incident surface 117 of the slider, and coupled to the optical waveguide 113.

In a thermally-assisted magnetic recording head for attaining high density recording, an optical near-field transducer 115 that changes a light guided to the optical waveguide 113 into a small spot size is disposed near an ABS surface 111 of the optical waveguide 113, and a magnetic transducer 114 for recording and a magnetoresistive sensor 116 for regeneration are disposed to the vicinity thereof.

In the submount 120, a hole passing through in the direction of the thickness is formed as a structure 127 for allowing a light to pass therethrough and a micro-lens structure 129 is fabricated in the hole. The micro-lens structure can be fabricated, for example, by resin molding.

By mounting the laser diode 100 once to the submount 120 to prepare a COC structure, mounting can be conducted by an active alignment method. Glue 112 such as a chemical adhesive resin is used for the bonding of the submount 120 and the slider 110.

By using the structure and the mounting procedure of the invention, the laser diode can be mounted at a high accuracy to the slider by the active alignment method to attain an optical device integrated head having a high light utilization efficiency.

Further, by using the submount, good products can be selected due to initial characteristics of semiconductor laser diodes. In a step of selecting failed products of laser diodes completed by way of a wafer process, it is usually necessary to measure optical output characteristics, modulation characteristics, and initial reliability, etc. of the laser diode device as the semiconductor optical device in a state after mounting to a substrate such as a submount. Since only simple characteristic screening can be conducted in the state of a chip, when the laser diode is mounted directly on the slider, this increases a possibility of mounting a failed product on the slider. Further, since mounting is conducted by a passive alignment method, there is also a high possibility of yielding failed products due to the positional displacement during mounting. The characteristics of the laser diodes are measured specifically to select failed products only by the test after mounting to the slider and the failed products are discarded together with the slider. This may possibly lower the yield of the products.

By manufacturing a COC (Chip On Carrier) structure for mounting a laser diode on the submount in an intermediate manner as in the invention, failed products can be selected for COC. Further, since positional alignment is conducted by the active alignment method, less failure may occur to positional displacement and the yield can be improved.

Embodiment 2

Figure 5:
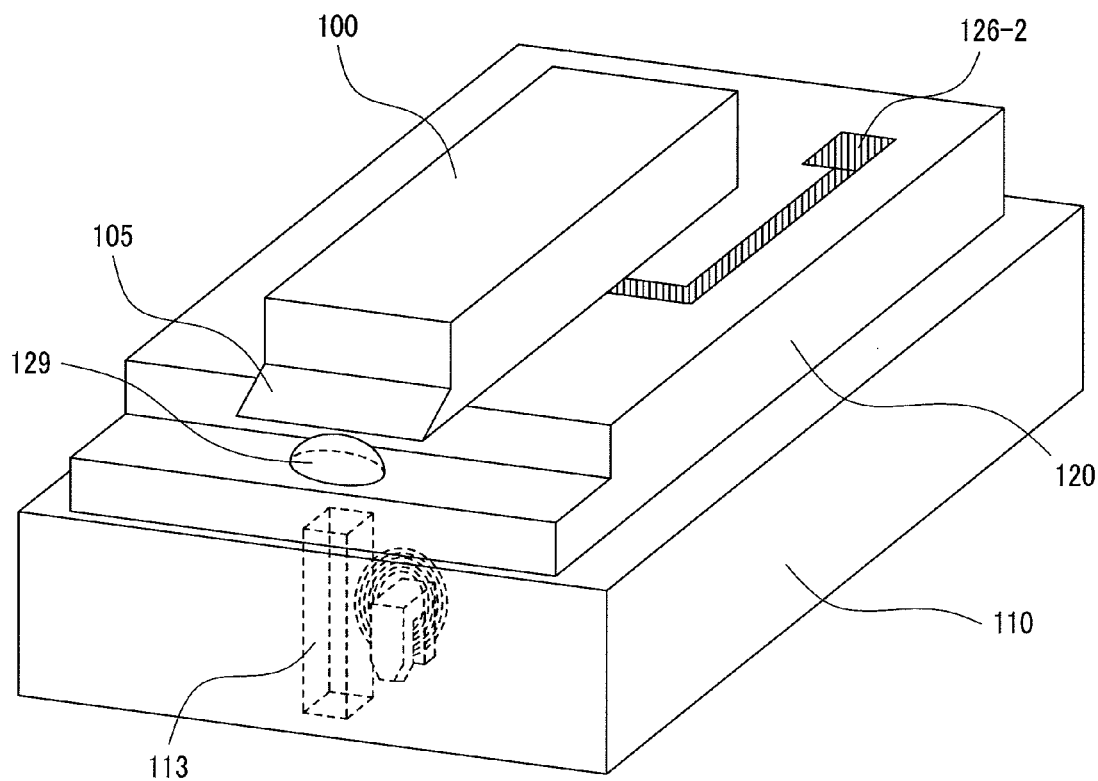
FIG. 5 is a perspective view showing an optical device integrated head as a structural body in which a submount having a semiconductor laser diode mounted thereon is mounted to a slider.
Figure 6A:
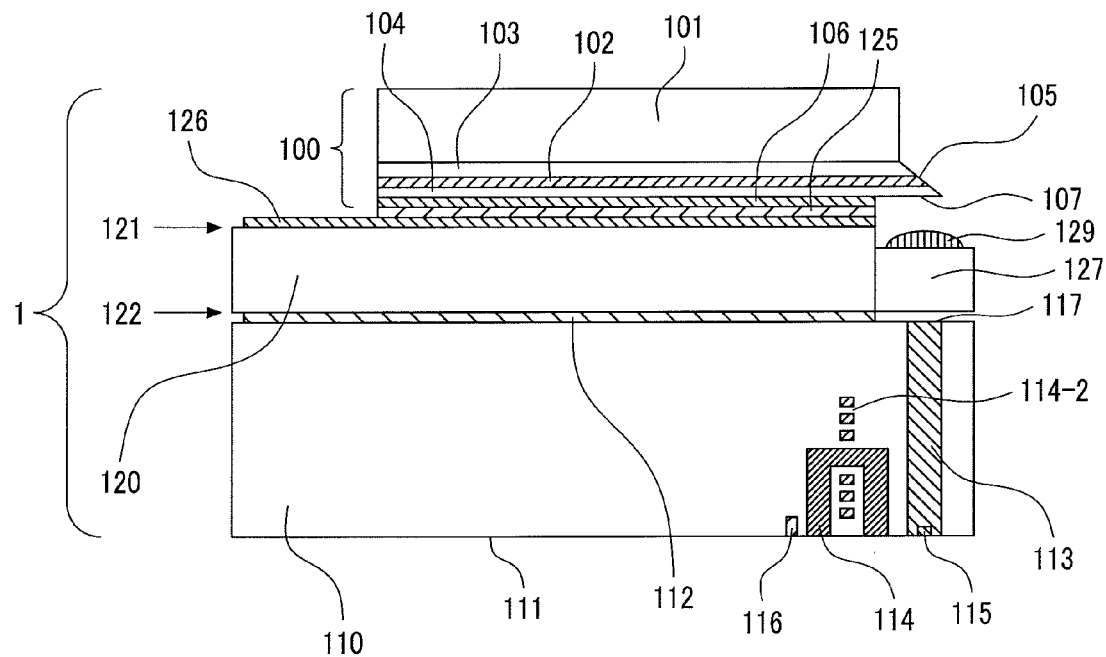
FIG. 6A is a cross sectional view of an optical device integrated head as a structural body in which a submount having a semiconductor laser diode mounted thereon is mounted to a slider along the direction of the cavity of the laser diode.
Figure 6B:
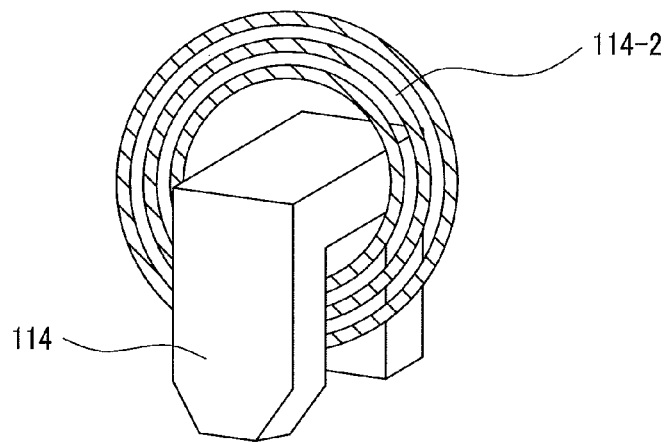
FIG. 6B is a perspective view showing a magnetic field transducer mounted to the optical device integrated head in FIG. 6A.

FIG. 5 is a perspective view schematically showing an optical device integrated head manufactured by mounting a semiconductor laser diode having a monolithically integrated reflection mirror on a submount as an embodiment of the invention and mounting the submount on a slider. FIG. 6A is a view showing a cross section of a laser diode along the direction of a cavity. FIG. 6B shows a perspective view for a magnetic transducer and coils to be mounted in FIG. 6A.

This embodiment is different from the embodiment 1 in view of the structure of the submount. In this structure, a submount 120 is cut to form a micro-lens structure 129. For a light transmitting structure 127, a material transparent to the emission wavelength of a laser diode, that is, a material having a large band gap may be used.

Embodiment 3

Figure 7:
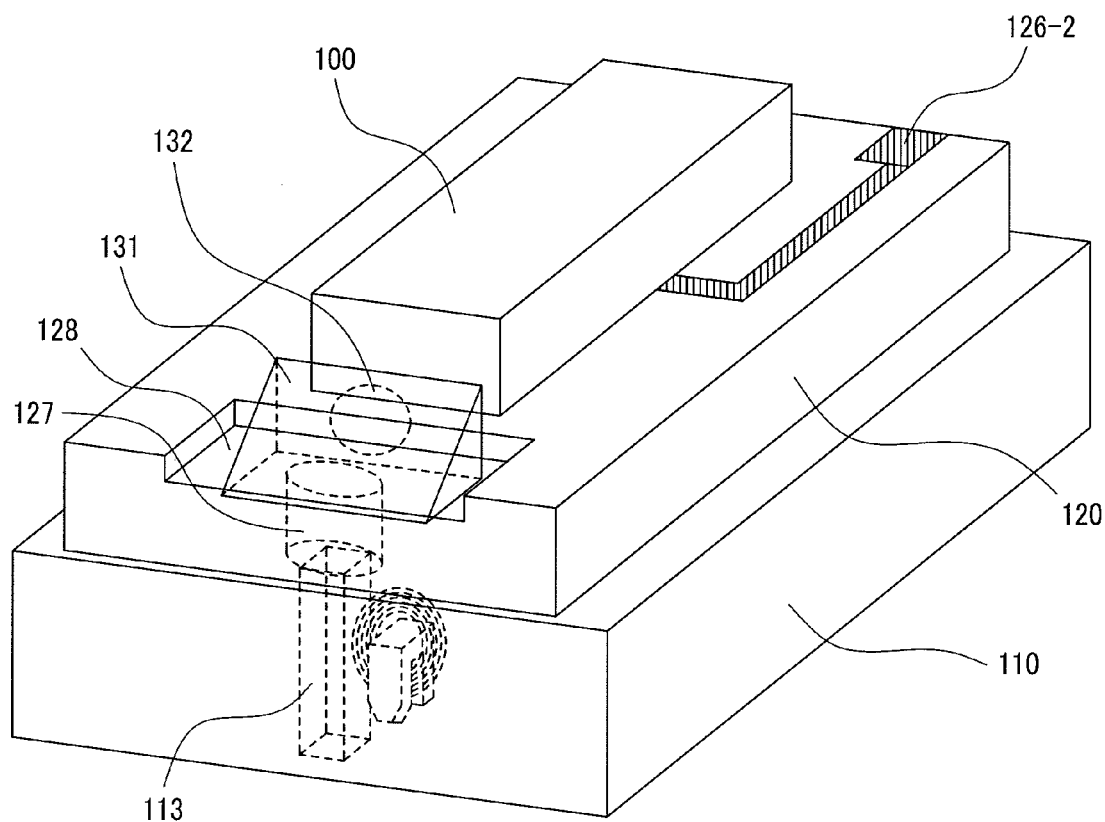
FIG. 7 is a perspective view showing an optical device integrated head as a structural body in which a submount having a semiconductor laser diode and a lens structure integrated reflection mirror mounted thereon is mounted to a slider.
Figure 8A:
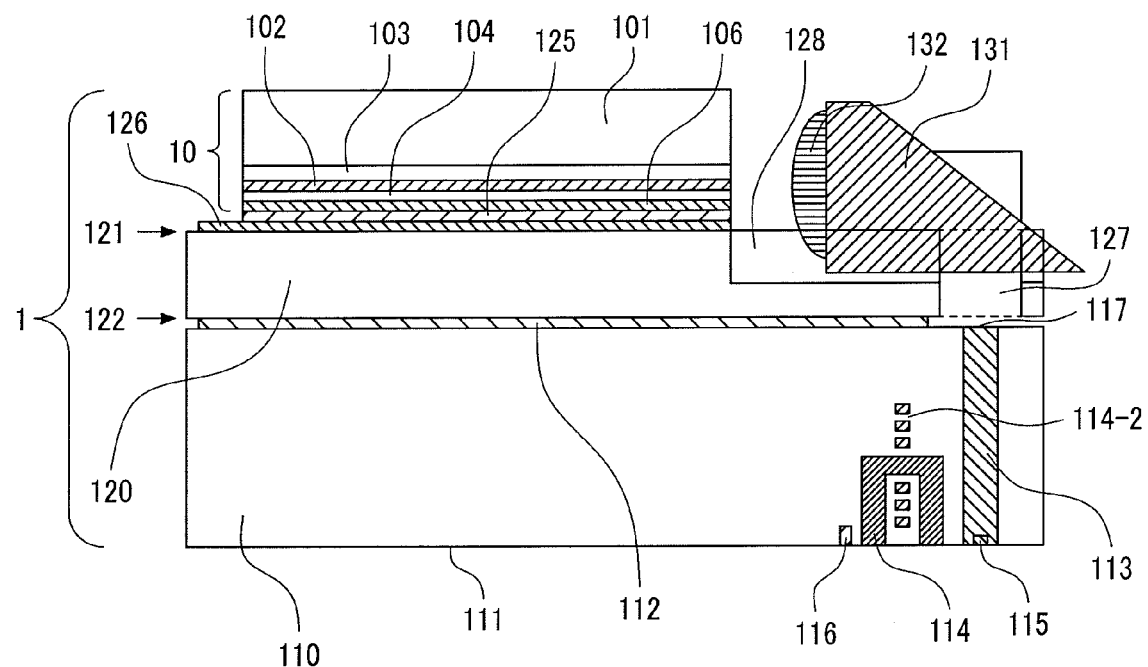
FIG. 8A is a cross sectional view of an optical device integrated head as a structural body in which a submount having a semiconductor laser diode and a lens structure integrated reflection mirror mounted thereon is mounted to a slider, along the direction of the cavity of the laser diode.
Figure 8B:
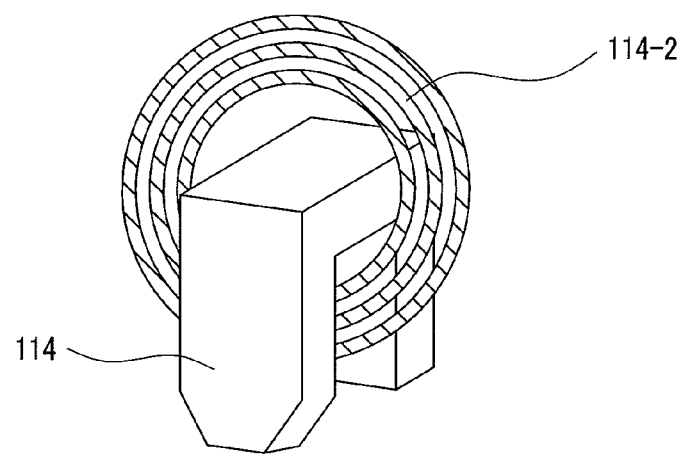
FIG. 8B is a perspective view showing a magnetic field transducer mounted to the optical device integrated head in 8A.

FIG. 7 is a perspective view showing a structure of attaining active alignment by using a laser diode, a reflection mirror, a submount, and a slider as a preferred embodiment of the invention. FIG. 8A is a view showing a cross section of a laser diode along the direction of a cavity. FIG. 8B is a perspective view of a magnetic transducer and coils to be mounted in FIG. 8A.

Active alignment is conducted by using an edge-emitting laser diode 10 and a reflection mirror 131 for converting the propagating direction of a light of the laser diode instead of the surface emitting laser diode having the mirror integrated to the laser diode of the embodiment 1 to conduct mounting. With a viewpoint of a mounting space, a lens structure 132 is integrated with the mirror. It is simple and convenient to fix the mirror 131 to a groove 128 in the submount upon mounting the laser diode 10 and the reflection mirror 131 on the submount 120. Since the example of the mirror shown in the drawing has a flat bottom, the groove 128 is made flat. However, in a case where the mirror is in a circular cylindrical shape, a V-shaped groove may sometimes be used for easy fixing. In the mounting of the COC structure and the slider 110, optical axes are aligned like in the embodiment 1 and a light emitted from the laser diode 10 transmits the mirror 131 and a structure 127 for allowing the light to pass therethrough such as a hole formed in the submount and is coupled with the optical waveguide 113.

Embodiment 4

FIG. 10A is a schematic view of connecting an optical device integrated head as a preferred embodiment of the invention and a suspension for mechanically driving the head. In the drawing, detailed constituent elements for each of parts are omitted or shown schematically. An optical integrated head is constituted by connecting a submount 120 having a laser diode 100 mounted thereon with a slider 110, and the optical device integrated head is connected by way of a flexure 147 to a suspension 146. Since power is supplied to the laser diode through a lead line disposed to the flexure and the suspension, it is necessary that the flexure is electrically connected with a power supply lead on the submount. For this purpose, the flexure 147 is connected directly to the submount 120.

FIG. 10B is a schematic view for connecting an optical device integrated head as a preferred embodiment of the invention and a suspension for mechanically driving the head. A submount 120 having a laser diode 10 and an integrated mirror 131 mounted thereon is connected with a slider 110 to constitute an optical device integrated head. In the same manner as in FIG. 10A, the flexure 147 is connected directly to the submount 120.

Embodiment 5

FIG. 11A is a schematic view for connecting an optical device integrated magnetic head as a preferred embodiment of the invention and a suspension for mechanically driving the head. Detailed constituent elements for each of parts are omitted or shown schematically. A submount 120 having a laser diode 100 mounted thereon is connected with a slider 110 to constitute an optical device integrated magnetic head, and the optical device integrated magnetic head is connected by way of flexures to a suspension 146. Since driving power supply to the magnetic transducer and the laser diode, and transmission of electric signals to the magnetoresistive sensor are conducted through lead lines disposed to the flexure and the suspension, they have to be connected to respective lead lines on the head. While the lead lines for the magnetic transducer and the magnetoresistive sensor are present on the slider, the power supply lead as the lead line for the laser diode is present on the submount.

Accordingly, for electric connection of the flexures with the lead lines which are present on both of the slider and the submount, at least two flexures 147 are necessary in which a first flexure 147-1 is connected with the slider 110 and a second flexure 147-2 is connected with the submount 120, respectively.

FIG. 11B is a schematic view for connecting an optical head integrated magnetic head as a preferred embodiment of the invention and a suspension for mechanically driving the head. A submount 120 having a laser diode 10 and a lens integrated mirror 131 mounted thereon is connected with a slider 110 to constitute an optical device integrated magnetic head. In the same manner as in FIG. 11A, a first flexure 147-1 is connected with the slider 110 and a second flexure 147-2 is connected with the submount 120, respectively.

Embodiment 6

FIG. 12 is a schematic view showing a recording disk apparatus using the optical integrated head of the invention. A recording disc 142 as a recording medium is disposed in a casing 150 of the recording disc apparatus, and the recording disc 142 is rotated by a spindle 143. A laser diode 100 is mounted on a slider 111, and the slider is connected with an arm 145. The arm is driven by a voice coil motor 141 to move the head to a position for recording the rotating disc. A signal processing LSI 144 for processing writing and reading information of the recording data is also located in the casing.

What is claimed is:

1. An optical device integrated head comprising a slider, a submount mounted on the slider, and a semiconductor optical device mounted on the submount,
    wherein the semiconductor optical device has a first cladding layer disposed above a semiconductor substrate, an active layer formed on the first cladding layer, a second cladding layer formed on the active layer, and an inclined surface disposed to at least one edge of the semiconductor optical device in adjacent with the active layer or being positioned to the vicinity thereof,
    the inclined surface is provided with a mirror portion having an inclination for reflecting the output light from the active layer to a first main surface of the submount,
    the submount has a structure or a structural body of allowing a light to pass through the submount from the first main surface of the submount situated on the side in contact with the semiconductor optical device to a second main surface opposite to the first main surface,
    the slider has an optical waveguide disposed being passed through the slider such that a light outputted from the structure or the structural body for allowing the light to pass therethrough is passed in the direction of the thickness of the slider,
    the structure or the structural body for allowing the light to pass therethrough has a lens, and the slider is fixed to the second main surface of the submount such that the optical axis of the optical waveguide is substantially aligned with the optical axis of the output light reflected by the mirror portion.

2. The optical device integrated head according to claim 1, wherein the reflection surface of the mirror is disposed at an angle of 45 degree relative to the propagating direction of the propagated light such that a light propagated through the active layer is incident at an inclination of 45 degrees, reflected at an angle of 90 degrees and then entered to the lens.

3. The optical device integrated head according to claim 1, having the slider fixed to a desired position on the second main surface of the submount by using an optical alignment while relatively moving the submount and the slider in a state of fixing the semiconductor optical device to the first main surface of the submount and emitting a light from the semiconductor optical device.

4. The optical device integrated head according to claim 1,
    wherein a p-electrode and an n-electrode are formed on one main surface of the semiconductor optical device situated on the side to be connected with the first main surface of the submount,
    a pair of electric leads are present on the first main surface of the submount, and
    one of the pair of electric leads is connected with the p-electrode and the other of the pair of electric leads is connected with the n-electrode.

5. The optical device integrated head according to claim 1,
    wherein the slider has one main surface in contact with the submount, and the other main surface disposed to a position opposite to the main surface,
    an optical near-field transducer is disposed at the edge of the optical waveguide on the side of the other main surface, and
    a magnetic transducer and a magnetoresistive sensor are disposed on the side of the other main surface spaced by a predetermined distance from the optical near-field transducer.

6. The optical device integrated head according to claim 1, wherein the flexure for connecting the head and the suspension is connected with the submount.

7. The optical device integrated head according to claim 1, having at least two flexures for connecting the head and the suspension in which one of the flexures is connected with the slider and the other is connected with the submount respectively.

8. An optical device integrated head comprising a slider, a submount mounted on the slider, a semiconductor optical device mounted on the submount, and a reflection mirror,
    wherein the semiconductor optical device is an edge emitting semiconductor optical device having a first cladding layer formed on the semiconductor substrate, an active layer formed above the first cladding layer, and a second cladding layer formed on the active layer,
    the submount has a first main surface for mounting the semiconductor optical device and a second main surface connected with the slider and opposed to the first main surface, and having:
    a structure or a structural body, on the first main surface, having the reflection mirror mounted thereon for receiving and reflecting an output light from the semiconductor optical device and allowing a light to pass through the submount from the first main surface to the second main surface,
    the slider has an optical waveguide disposed through the slider for allowing a light outputted from the structure or the structural body for allowing the light to pass therethrough so as to pass in the direction of the thickness of the slider, a lens structure is monolithically integrated to the reflection mirror, and the slider is fixed to the second main surface of the submount such that the optical axis of the optical waveguide is substantially aligned with the optical axis of a light emitted from the semiconductor optical device by way of the reflection mirror and the structure or the structural body for allowing the light to pass therethrough.

9. The optical device integrated head according to claim 8, having the slider fixed to a desired position on the second main surface of the submount by using an optical alignment while relatively moving the submount and the slider in a state of fixing the semiconductor optical device to the first main surface of the submount and emitting a light from the semiconductor optical device.

10. The optical device integrated head according to claim 8, wherein a p-electrode and an n-electrode are formed on one main surface of the semiconductor optical device situated on the side to be connected with the first main surface of the submount, a pair of electric leads are present on the first main surface of the submount, and one of the pair of electric leads is connected with the p-electrode and the other of the pair of electric leads is connected with the n-electrode.

11. An optical device integrated head according to claim 8, wherein the slider has one main surface in contact with the submount, and the other main surface disposed to a position opposite to the main surface, an optical near-field transducer is disposed at the edge of the optical waveguide on the side of the other main surface, and a magnetic transducer and a magnetoresistive sensor are disposed on the side of the other main surface spaced by a predetermined distance from the optical near-field transducer.

12. The optical device integrated head according to claim 8, wherein the flexure for connecting the head and the suspension is connected with the submount.

13. the optical device integrated head according to claim 8, having at least two flexures for connecting the head and the suspension in which one of the flexures is connected with the slider and the other is connected with the submount, respectively.

* * * * *